United States Patent [19]

Green

[11] 4,198,182
[45] Apr. 15, 1980

[54] METHOD OF MANUFACTURING A MOULD FOR PRODUCING A LAMP LENS ELEMENT

[75] Inventor: Stanley Green, Warley, England

[73] Assignee: Lucas Industries Limited, Birmingham, England

[21] Appl. No.: 897,875

[22] Filed: Apr. 19, 1978

Related U.S. Application Data

[63] Continuation of Ser. No. 719,307, Aug. 31, 1976, abandoned.

[30] Foreign Application Priority Data

Sep. 20, 1975 [GB] United Kingdom ............... 38691/75

[51] Int. Cl.² ............................................... B23C 3/00
[52] U.S. Cl. ....................................... 409/132; 51/326
[58] Field of Search ................... 90/11 C, 15 R, 15 A, 90/17; 219/69 M; 51/326, 327; 409/131, 132

[56] References Cited

U.S. PATENT DOCUMENTS

| | | | |
|---|---|---|---|
| 2,137,079 | 11/1938 | Falge | 90/11 R |
| 2,552,455 | 5/1951 | Pond | 90/11 C X |
| 2,890,627 | 6/1959 | Onksen et al. | 90/11 C |
| 3,857,011 | 12/1974 | Saito et al. | 219/69 M |

FOREIGN PATENT DOCUMENTS

| | | | |
|---|---|---|---|
| 605279 | 7/1948 | United Kingdom | 90/11 C |
| 1387589 | 3/1975 | United Kingdom | 90/11 R |

*Primary Examiner*—Z. R. Bilinsky
*Attorney, Agent, or Firm*—Ladas, Parry, Von Gehr, Goldsmith & Deschamps

[57] ABSTRACT

A mould for producing a lamp lens element comprises a mould plate having a plurality of recesses in one face thereof. Each recess is adapted to produce a projection on one face of the lens element produced from the mould, and is shaped so as to define in the projection a lens integral with and overlying a prism. In one embodiment, each recess has a concave part-spherical surface portion whose axis is inclined to the perpendicular to the general plane of the said one face of the mould plate. Alternatively, each recess is in the form of an elongate groove having a part-cylindrical mid-region whose axis is inclined relative to the general plane of the said one face of the mould plate. In the latter case, the groove also has part-spherical end regions whose axes are each either perpendicular to the said general plane or inclined at an acute angle to the perpendicular to the general plane. In a further embodiment, each recess is in the form of an elongate groove wich is concavely curved in a longitudinal plane thereof and shaped so that the said lens and the said prism are each of part-annular form. In all of the above cases, adjacent recesses overlap and are arranged in a plurality of rows.

A method of manufacturing a mould for producing a lamp lens element comprises effecting a cutting operation on a mould plate to produce in one face thereof a plurality of recesses of the type described above. The cutting operation is effected using either a spherical cutter or a Woodruff-type cutter, as the case may be. Where a spherical cutter is used, the rotation axis thereof is either oriented perpendicularly with respect to the general plane of the said one face of the mould plate, or is inclined at an acute angle to the perpendicular to the general plane of the said one face of the mould plate. Where the spherical cutter is used to produce a groove, the cutter is first brought into contact with the said one face of the mould plate, and the mould plate and cutter are then moved relative to one another at an angle to the said general plane.

15 Claims, 13 Drawing Figures

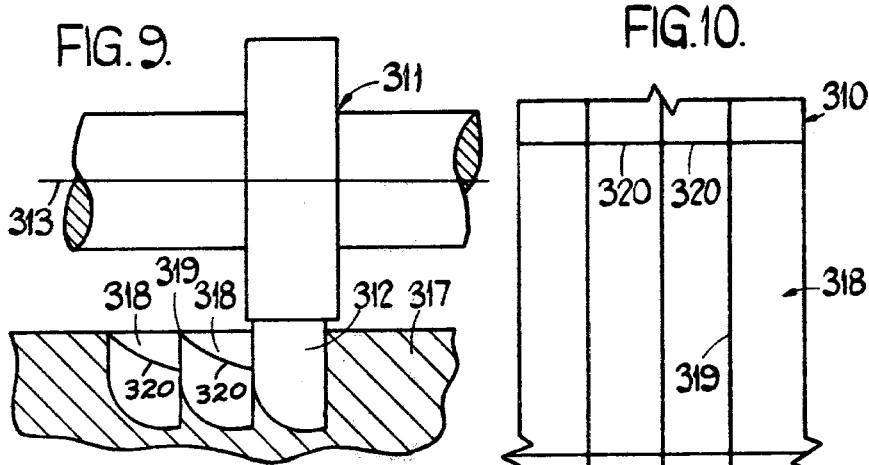
FIG. 9.
FIG. 10.
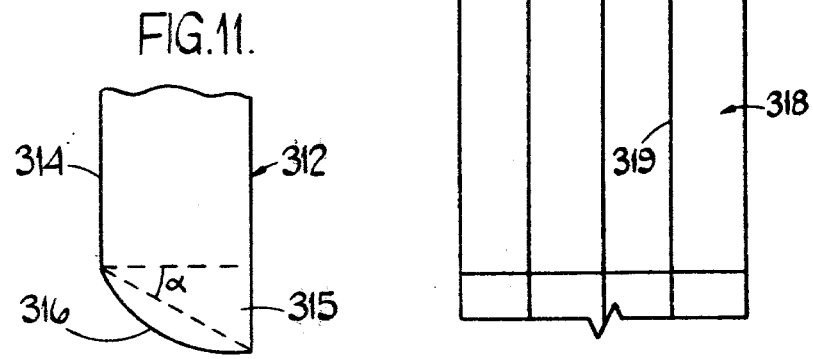
FIG. 11.
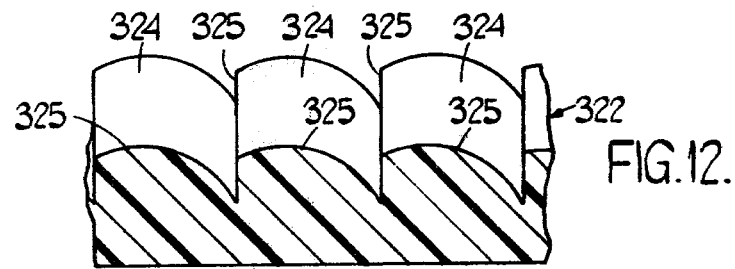
FIG. 12.
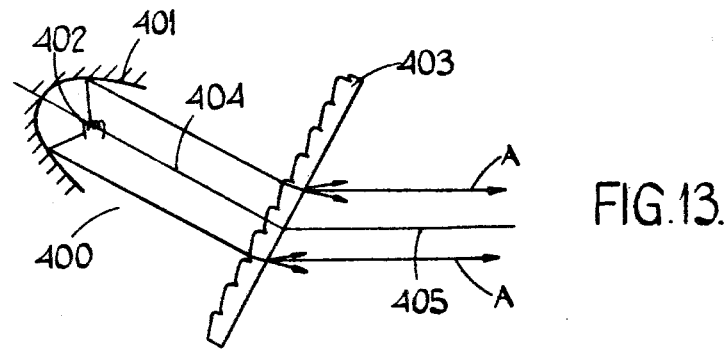
FIG. 13.

METHOD OF MANUFACTURING A MOULD FOR PRODUCING A LAMP LENS ELEMENT

This is a continuation of copending application Ser. No. 719,307 filed Aug. 31, 1976 and now abandoned.

This invention relates to a mould for producing a lens element, such lens element is particularly, though not exclusively, for use in a vehicle lamp unit having a reflector whose axis is inclined in a horizontal plane to the axis of the vehicle. This invention also relates to a method of manufacturing such a mould.

According to one aspect of the present invention, there is provided a mould for producing a lamp lens element, comprising a mould plate having a plurality of recesses in one face thereof, each said recess being adapted to produce a projection on one face of said lens element and being shaped so as to define in said projection a lens integral with and overlying a prism.

In one embodiment, each said recess has a concave surface portion defined by part of a body of revolution, preferably a conoidal or near-conoidal body and most preferably a sphere, whose axis is inclined to the perpendicular to the general plane of said one face of the mould plate in the region of said recess.

In an alternative embodiment, each said recess is in the form of an elongate groove having a part-cylindrical mid-region whose axis is inclined relative to the general plane of said one face of the mould plate in the region of said recess. Each groove may be provided with end regions which are each defined by part of a body of revolution, preferably a or near-conoidal conoidal body, whose axis is either perpendicular to said general plane or inclined at an acute angle to the perpendicular to said general plane. The said mid-regions of some or all of the recesses are conveniently part-circular cylindrical in form, and the said end regions when provided are each preferably part-spherical in form.

In a further alternative embodiment, each said recess is in the form of an elongate groove concavely curved in a longitudinal plane thereof and shaped so that said lens and said prism are each of part-annular form.

Desirably, the recesses are arranged in a plurality of parallel rows. Most desirably, adjacent recesses in adjacent rows are transversely aligned so as to define a further plurality of parallel rows at right-angles to the first-mentioned plurality of rows.

According to another aspect of the present invention, there is provided a method of manufacturing a mould for producing a lamp lens element, comprising effecting a cutting operation to produce a plurality of recesses in one face of a mould plate, each said recess being adapted to produce a projection on one face of the said lens element and being shaped so as to define in said projection a lens integral with and overlying a prism.

In one embodiment, the cutting operation produces recesses which each have a concave surface portion defined by part of a body of revolution, preferably a conoidal or near-conoidal body and most preferably a sphere, whose axis is inclined to the perpendicular to the general plane of said one face of the mould plate in the region of that recess.

Advantageously, the cutting operation is performed using a rotating cutter defined by part of a body of revolution whose axis is coincident with the rotation axis of said cutter, said rotation axis being inclined at an acute angle to the perpendicular to said general plane. Desirably, the cutter is defined by a conoidal body, or near-conoidal body.

In an alternative embodiment, the cutting operation produces recesses which are each in the form of an elongate groove, each groove having a part-cylindrical mid-region whose axis is inclined relative to the general plane of said one face of the mould plate in the region of that recess. The cutting operation may also produce end regions in each groove, which end regions are each defined by part of a body of revolution, preferably a conoidal or near conoidal body, whose axis is either perpendicular to said general plane or inclined at an acute angle to the perpendicular to said general plane.

Advantageously, the cutting operation is effected using a rotating cutter defined by part of a body of revolution whose axis is coincident with the rotation axis of said cutter, said rotation axis being perpendicular to said general plane or inclined at an acute angle to the perpendicular to said general plane, each groove being cut by bringing the cutter into contact with said one face of the mould plate, and effecting relative movement between the cutter and the mould plate at an angle to said general plane.

In the case where said cutter rotation axis is inclined at an acute angle to the perpendicular to said general plane, the direction of relative movement between the cutter and the mould plate is conveniently arranged to be in the plane of inclination of the cutter rotation axis and preferably also perpendicular to said cutter rotation axis.

Desirably, the cutter is a spherical cutter. The term "spherical cutter" is used herein to include any tool which will produce a part-spherical recess in a workpiece, and accordingly the term "radius of the spherical cutter" as used herebelow is intended to mean the radius of curvature of a recess which the cutter will produce.

In a further alternative embodiment, the cutting operation produces recesses which are each in the form of an elongate groove, each groove being concavely curved in a longitudinal plane thereof and being shaped so that said lens and said prism are each of part-annular form.

Preferably, the cutting operation is effected using a rotating cutter having a cutting head rotatable about an axis, said cutting head being spaced from said rotation axis and facing outwardly therefrom. Advantageously, the cutter is of the Woodruff cutter type. Conveniently, the rotation axis of the cutter is oriented parallel to the general plane of said one face of the mould plate in the region of said recesses.

Embodiments of the present invention will now be described, by way of example, with reference to the accompanying drawings, in which:

FIG. 9 is a sectional side view of the mould plate and cutter of FIG. 8;

FIG. 10 is a plan view of the mould plate of FIGS. 8 and 9;

FIG. 11 is a sectional detail of the cutter of FIGS. 8 and 9;

FIG. 12 is a sectional side view of a lamp lens element produced from the mould of FIGS. 9 to 11; and FIG. 13 is a schematic plan view of a lamp unit including a lamp lens element produced by any of the methods indicated above.

Figure 1:
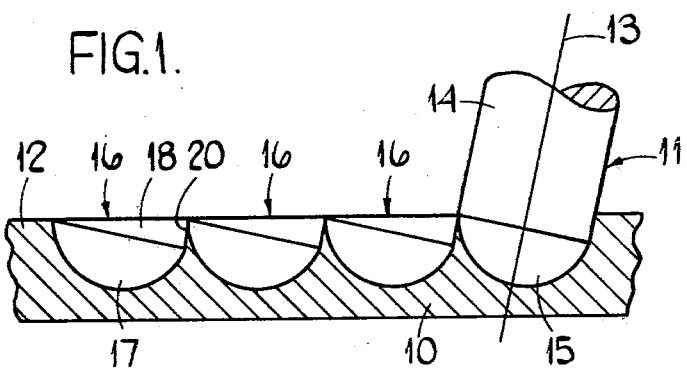
FIG. 1 is a sectional side view of a mould plate and cutter illustrating one method of manufacturing a mould for producing a lamp lens element, according to the present invention.
Figure 2:
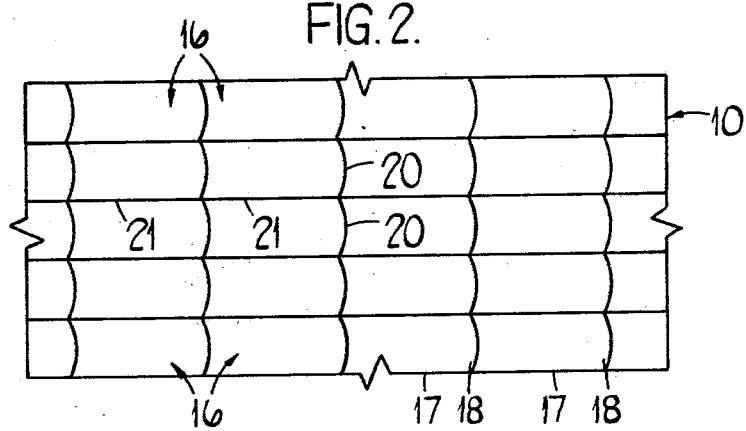
FIG. 2 is a plan view of the mould plate shown in FIG. 1.

Referring to FIGS. 1 and 2, in one example of a method of manufacturing a mould for producing a lamp lens element, a metal plate 10 which is to form the base of the mould is mounted on a bed (not shown) of a cutting machine. A rotating cutter 11 is moved into contact with a planar face 12 of the plate 10, the axis of rotation 13 of the cutter 11 being inclined at an acute angle to the perpendicular to the plane of face 12. The cutter 11 comprises a circular cylindrical body 14 and a part-spherical end portion 15, the axes of the body 14 and the end portion 15 being coincident with axis 13. The cutter 11 is then moved into the plate 10 to a predetermined depth beyond portion 15 so as to cut a recess 16 in the plate 10. The recess 16 has a part-spherical concave surface portion 17, which is cut by portion 15 of the cutter 11, and a part-circular cylindrical surface portion 18, which is cut by the body 14 of the cutter 11. It will be manifest that the major axes of both surface portions 17 and 18 are inclined at an acute angle to the perpendicular to the plane of face 12.

After recess 16 has been cut, the cutter 11 is withdrawn from the mould plate 10, and the latter is then moved relative to the cutter 11 through a predetermined distance in the plane of inclination of axis 13. The cutter 11 is then used to cut a further recess 16 in the mould plate 10. The dimensions of the cutter 11, the depth of cut, and the said predetermined distance moved by mould plate 10 are so arranged that the recesses 16 overlap and define therebetween a line boundary edge 20. Thereafter, this process is repeated at intervals along the mould plate 10 to produce a first row of overlapping recesses 16 therein.

The cutter 11 as then employed in the same manner to produce further rows of overlapping recesses parallel to the first row. The spacing between the rows is so chosen in relation to the dimensions of the cutter 11 and the depth of cut that further line boundary edges 21 are produced between adjacent recesses in adjacent rows. These further line boundary edges 21 are produced in alignment and appear as straight lines running along the plate 10 parallel to the rows of recesses when viewed in plan, as in FIG. 2. In addition, adjacent recesses in adjacent rows are transversely aligned so as to produce a plurality of further rows of overlapping recesses extending in a direction perpendicular to the first-mentioned rows.

Figure 3:
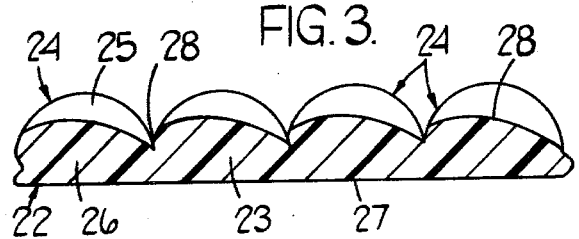
FIG. 3 is a sectional side view of a lamp lens element produced from the mould of FIGS. 1 and 2.

A lamp lens element 22, shown in FIG. 3, is produced by a moulding operation using the mould described above. The lens element 22 is moulded in a transparent synthetic resin coloured to suit the particular application of the lens element, and comprises a panel 23 having a plurality of projections 24 integrally formed on one face thereof. Each projection 24 is complementary in shape to the recess 16 which produced it that is to say it has a convex, part-spherical surface 25 corresponding in shape to the surface portion 17 of recess 16, and a part-circular cylindrical portion 26 corresponding in shape to the surface portion 18 of recess 16. Both of portions 25 and 26 have their major axes inclined at an acute angle to the perpendicular to the general plane of a face 27 of panel 23 remote from the projections 24. The portion 26 defines a prism by virtue of its inclination to face 27, and the volume enclosed by surface 25 defines a spherical lens which overlies and is integral with the said prism.

The projections 24 are arranged in a plurality of parallel rows, adjacent projections 24 in adjacent rows being transversely aligned so as to define a further plurality of rows perpendicular to the first-mentioned plurality of rows. The projections 24 also overlap, so that a line boundary edge 28 is defined between each pair of adjacent projections 24. Those line boundary edges 28 which are parallel to the direction of inclination of the said major axes of portions 25 and 26 appear as straight lines extending along the lens element 22 parallel to the first-mentioned rows, when viewed in plan, although in fact they each curve out of the general plane of panel 23.

Figure 4:
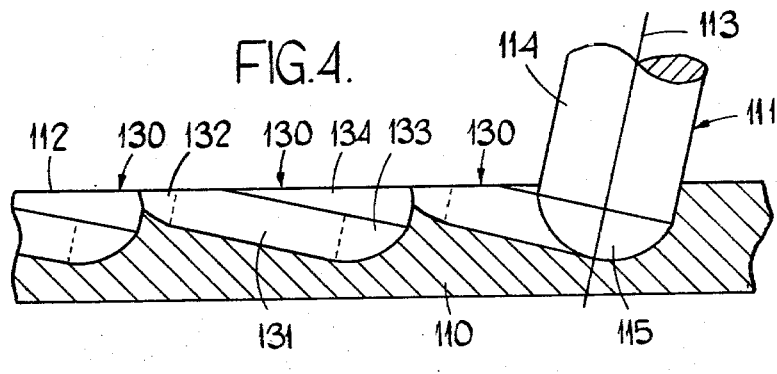
FIG. 4 is a sectional side view of a mould plate and a cutter illustrating a second method of manufacturing a mould for producing a lamp lens element, according to the present invention.
Figure 5:
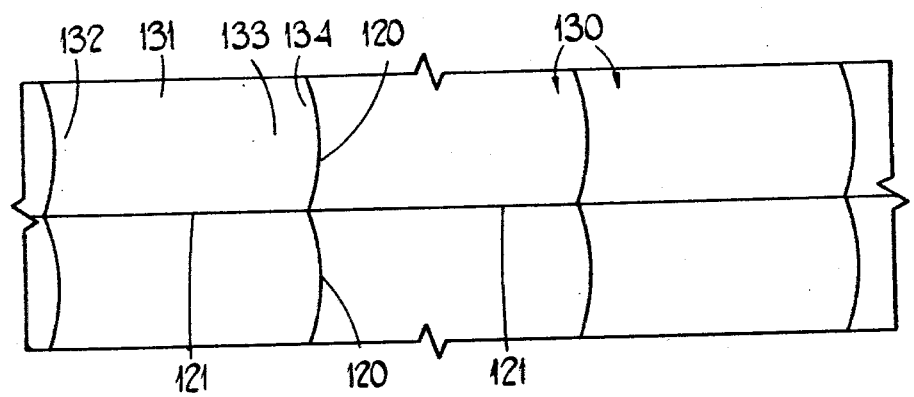
FIG. 5 is a plan view of the mould plate shown in FIG. 4.

Turning now to FIGS. 4 and 5, there is illustrated therein a second method by which a mould for producing a lamp lens element is manufactured. This method is similar to that described above in relation to FIGS. 1 and 2 and accordingly similar parts are denoted by the same reference numerals prefixed by 1. However, the method of FIGS. 4 and 5 differs from that of FIGS. 1 and 2 in that, before the cutter 111 is withdrawn from the mould plate 110, the latter is moved relative to the cutter 111 at an acute angle to the plane of face 112 and in the direction of inclination of the axis 113 of cutter 111, so that the cutter 111 cuts an inclined, elongate groove 130. Moreover, the direction of movement of the mould plate 110 is arranged to be perpendicular to the axis 113.

The groove 130 thus cut has a part-circular cylindrical mid-region 131 whose axis is inclined relative to the plane of face 112, part-spherical end regions 132, 133 at either end of mid-region 131 and a wedge-shaped region 134 overlying part of mid-region 131. The end regions 132, 133 each have their major axis inclined at an acute angle to the perpendicular to the plane of face 112, by virtue of the inclination of cutter 111. Moreover the axis of mid-region 131 is perpendicular to the axis of each end region 132, 133. From FIG. 4 it will be manifest that mid-region 131 and end regions 132, 133 are all cut by portion 115 of the cutter 111, whereas region 134 is cut by the body 114 of cutter 111.

As in the embodiment of FIG. 1, after one groove 130 has been cut, further mutually overlapping grooves 130 are also cut in the mould plate 110 so as to produce a plurality or rows of grooves. The portion 115 of the cutter 111 preferably has a radius of curvature between 0.100 ins. and 0.250 ins., most preferably between 0.156 ins. and 0.187 ins. A single cutter 111 can be used to cut all of the grooves 130, but equally cutters of different radii can be used to cut the grooves 130 in different regions of the mould plate 110. In one particular example, the grooves 130 are each 0.187 ins. long and 0.093 ins. wide, and thus have a length to width ratio of 2:1. However, in another example some or all of the grooves 130 are 0.137 ins. long and 0.112 ins. wide. The mid-region 131 of each groove 130 is cut so as to be inclined to the plane of face 112 at an angle of 30° or thereabouts.

Figure 6:
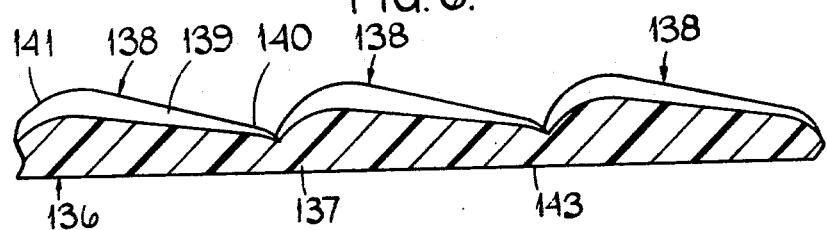
FIG. 6 is a sectional side view of a lamp lens element produced from the mould of FIGS. 4 and 5.

FIG. 6 shows a lamp lens element 136 produced using a mould manufactured by the method described above in relation to FIGS. 4 and 5. The lens element 136 comprises a panel 137 having a plurality of elongate ridges 138 formed integrally on one face thereof. Each ridge 138 is complementary in shape to the groove 130 which produced it, that is to say it has a part-circular cylindrical mid-region 139 corresponding in shape to the mid-region 131 of groove 130, and part-spherical end regions 140, 141 integral with mid region 131 and corresponding in shape to end-regions 132, 133 respectively. The mid-region 139 has its axis inclined at an acute angle to the general plane of a face 143 of panel 137 remote from the ridges 138, and the end regions 140, 141 each have their major axes inclined at an acute angle to the perpendicular to the said general plane of face 143. The regions 139, 140 and 141 together define a lens and, by virtue of the inclination of mid-region 139, define a prism also, the said lens overlying and being integral with the said prism.

It will be manifest that the lens element 136 is essentially similar to the lens element 22 described previously, except that a part-circular cylindrical mid-region 139 is now provided in each ridge 138 to increase the amount of light transmitted in a predetermined direction. As is the case for lens element 22, the lens element 136 has its ridges 138 arranged in a plurality of parallel, overlapping rows with adjacent ridges 138 in adjacent rows being transversely aligned.

Figure 7:
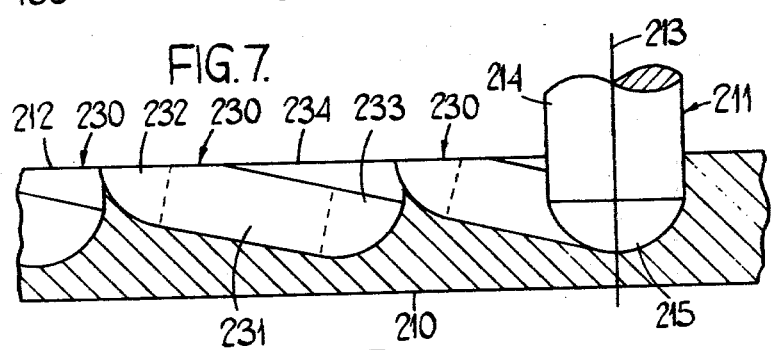
FIG. 7 is a sectional side view of a mould plate and cutter illustrating a third method of manufacturing a mould for producing a lamp lens element, according to the present invention.
Figure 8:
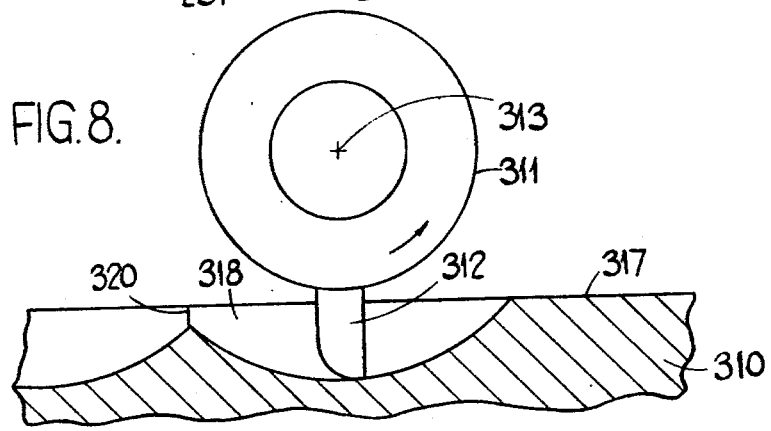
FIG. 8 is a sectional front view of a mould plate and a cutter illustrating a fourth method of manufacturing a mould for producing a lamp lens element, according to the present invention.

Referring now to FIG. 7, there is illustrated therein a third method of manufacturing a mould for producing a lamp lens element. This method is identical to that described above in relation to FIGS. 4 and 5, similar parts being accorded the same reference numerals with 100 added, except that the cutter 211 is now orientated so that its rotation axis 213 is perpendicular to the plane of face 212. It will be manifest that the end regions 232, 233 of the grooves 230 and, correspondingly, the end regions of the ridges on one face of the lens element now have their major axes perpendicular to the plane of face 212 and the general plane of the opposite face of the lens element, respectively.

In the embodiments described above, the recesses or grooves in the mould plate are produced using a cutter having a part-spherical end portion. However, other forms of cutter may be used, such as conical, ellipsoidal or paraboloidal cutters, in which case the cross-sectional shapes of the recesses or grooves in the mould plate, and correspondingly the cross-sectional shapes of the projections or ridges of the lens element, will be altered.

A fourth method of manufacturing a mould for producing a lamp lens element is illustrated in FIGS. 8 to 11. A metal plate 310 which is to form a base of the mould is mounted on a bed (not shown) of a cutting machine, which machine also includes a rotatable cutter 311. The cutter 311 incudes a cutting head 312 rotatable about an axis 313, the head 312 being spaced from and facing radially outwardly of the axis 313. Advantageously, the cutter 311 is of the Woodruff cutter type, but is arranged to produce a smaller radius of cut than conventional Woodruff cutters.

A section through the cutting head 312, taken in the plane of the axis 313, is shown in FIG. 11. The head 312 includes a body 314, a wedge shaped portion 315 integral with the body 314, and a curved portion 316 integral with portion 315, the curved portion 316 forming the radially outermost part of the head 312.

The cutter 311 is moved into contact with a planar face 317 of the mould plate 310, the axis of the cutter 311 being oriented parallel to the general plane of face 317 and the cutting head 312 rotating about the axis 313. This causes the head 312 to cut an elongate groove 318 in the mould plate 310, which groove 310 is concavely curved in a longitudinal plane thereof (see FIG. 8). The groove 318 includes first and second part-annular portions corresponding respectively to the volume swept out by the portions 315 and 316 of the cutting head 312.

After groove 318 has been cut, the cutter 311 is withdrawn from the mould plate 310, and the latter is then moved relative to the cutter 311 through a predetermined distance in the direction of extent of axis 313. The cutter 311 is then used to cut a further groove 318 in the mould plate 310 so as to overlap the previously cut groove 318. The dimensions of the cutter 311, the depth of cut, and the said predetermined distance moved by the mould plate are arranged so that the grooves 318 define therebetween a line boundary edge 319. Thereafter, this process is repeated at intervals along the mould plate 310 to produce a first row of overlapping grooves 318 therein.

The cutter 311 is then used in the same manner to produce further rows of overlapping grooves parallel to the first row. The spacing between the rows is so chosen in relation to the dimensions of the cutter 311 and the depth of cut that further line boundary edges 320 are produced between adjacent grooves in adjacent rows. These further line boundary edges 320 are produced in alignment and appear as straight lines running along the plate 310 parallel to the rows of grooves when viewed in plan, as in FIG. 10. In addition, adjacent grooves in adjacent rows are transversely aligned so as to produce a plurality of further rows of overlapping grooves extending in a direction perpendicular to the first-mentioned rows. As can be appreciated from FIG. 10, the line boundary edges 319 between adjacent pairs of grooves 318 in each of the first-mentioned rows also appear as straight lines when viewed in plan.

A lamp lens element 322, shown in FIG. 12 is produced by a moulding operation using the mould described above and in a manner similar to that employed in the embodiments described above. The lens element 322 comprises a panel 323 having a plurality of curved ridges 324 formed on one face thereof. Each ridge 324 is complementary in shape to the groove 318 which produced it. A part of the ridge 324 which is produced by the aforesaid first portion of the groove 318, i.e. that corresponding to the volume swept out by portion 315 of the cutting head 312, forms a prism of part-annular form; a part of the ridge 324 which is produced by the aforesaid second portion of the groove 318, i.e. that corresponding to the volume swept out by portion 316 of the cutting head 312, forms a lens also of part-annular form which overlies and is integral with the aforesaid prism. Typically, a cutting head 312 of width 2.5 mm and radius of rotation 10 mm is employed, resulting in the aforesaid prism having an included angle (schematically represented by $\alpha$ in FIG. 11) of 30°. In this case, the resultant lens element is suitable for use in a fog rearguard lamp unit.

The ridges 324 are arranged in a plurality of parallel rows, adjacent ridges 324 in adjacent rows being transversely aligned so as to define a further plurality of rows perpendicular to the first-mentioned plurality of rows. Adjacent ridges 324 also overlaps, so that line boundary edges 325 are defined therebetween, which boundary edges when viewed in plan form a rectangular grid, although in fact they each curve out of the general plane of panel 33.

It will be appreciated that the lens element 322 is designed such that the lens in each ridge 324 is inclined in the direction of the shorter dimension of that ridge when viewed in plan. This is in contrast to the lens elements produced as described above in relation to FIGS. 4 to 6 and FIG. 7, in which the lens in each ridge is inclined in the direction of the longer dimension of that ridge when viewed in plan.

A lamp lens element of the above type when manufactured by conventional techniques is difficult to polish. The method of the present invention can produce a fine finish to the lens element whereby no final polishing is necessary, resulting in a great saving in labour.

In an alternative embodiment (not shown), the cutter 311 is initially used to cut a groove in the mould plate 310 in the manner indicated above, and then the groove is extended in the direction of the cutter axis 313 and/or in a direction transverse to the cutter axis 313 by effecting relative movement between the cutter 311 and the mould plate 310 in the appropriate direction. It is preferred that the mould plate 310 is moved relative to the cutter 311 to extend the groove.

In a further alternative embodiment (also not shown), a milling cutter is used in place of the Woodruff-type cutter. The milling cutter has a radius of the order of, for example, ¼ in, and is used in conjunction with a copying attachment which follows the contours of flutes on a master plate defining the shapes of the grooves to be cut in the mould plate.

In a still further alternative embodiment (not illustrated), grooves are cut in the mould plate 310 by means of a milling machine having a rotary cutter whose radius of swing can be set by means of a dial on the machine. Typically, the radius of swing of the cutter is set at ½ in.

As an alternative to using a rotating cutter, the cutting operation to produce the recesses or grooves in the mould plate can be effected by a spark erosion process or other form of cutting operation.

In the above-described embodiments, the lens element is produced directly from the mould plate in which recesses or grooves have been cut. However, the mould plate may itself be used as a master for producing a further mould element, which mould element is then used to form the lens element.

In one example of such a process, the mould plate is used to spark-erode a metal block, thereby producing on the metal block a plurality of projections or ridges conforming in shape to the recesses or grooves in the mould plate. The lens element is then produced using the metal block as a mould. It will be manifest that, in this case, the lens element is produced with recesses or grooves therein which take the place of the projections and ridges described in the previous embodiments. However, it will also be manifest that the resultant lens element achieves the same effect as that described above by virtue of the fact that each recess or groove therein takes the form of a "negative" lens superimposed on a prism. Because the mould plate initially produced is used solely to spark erode the metal block, the mould plate can be made of a material which is relatively easily machinable but which would otherwise not be hard enough to be used in a lens element moulding operation.

In another example of such a process, the mould plate is used in an electroforming operation to produce a copy which is subsequently used in the lens element moulding operation.

FIG. 13 shows, schematically, a lamp unit 400 including a dished reflector 401, a light bulb 402 and a lens element 403. The lens element 403 is any one of the lens elements described above. The lamp unit 400 is mounted on a motor vehicle (not shown) with an axis 404 of the reflector 401 inclined in a horizontal plane at an acute angle to a line 405 parallel to the vehicle axis. Light emitted by bulb 402 is reflected by the reflector 401 so as to be parallel to the reflector axis 404, and therefore inclined to the vehicle axis. The lens element 403 overlies the reflector 401 with the projections or ridges thereon presented to the bulb 402 and reflector 401. The inclination of the projections or ridges is chosen so that, having regard to the orientation of the lens element 403 relative to the reflector axis 404, a portion of the light incident upon the lens element 403 from the bulb 402 and reflector 401 is deviated so as to emerge from the lamp unit parallel to the vehicle axis, as illustrated by arrows A. It is to be appreciated that the proportion of light thus deviated is rather larger in the case where the lens element 403 is of the form shown in FIG. 6 than in the case where the lens element 403 is of the form shown in FIG. 3, due to the presence of the mid-regions 139 in the ridges 138 of the former.

In an alternative embodiment (not shown), the lamp unit is of "wrap around" form, wherein respective parts of the lens element extend along the front and rear of the motor vehicle and along a side thereof. The projections or ridges on each of the said parts of the lens element are inclined by different amounts, so that a portion of the light emitted from the lamp unit is made visible from the side of the motor vehicle.

It is to be appreciated that a lens element produced from the mould of the present invention has many uses, and its incorporation into a vehicle lamp unit is only one example.

In a particular example of the present invention, a rotating cutter is used whose cross-section is formed by a developed curve computed so as to provide ideal or near-ideal optical properties in the complete lens element.

The method of the present invention provides an inexpensive way of manufacturing a mould plate for producing a lamp lens element having inclined projections or ridges thereon.

In the specification and claims, the term "cylindrical" means having the form of a surface traced by a straight line moving parallel to a fixed straight line and intersecting a fixed curve, and the term "conoidal" means having the form of a surface traced by a conic section when rotated about its axis.

I claim:

1. A method of manufacturing a mould for producing a lamp lens element, comprising the steps of:
   (a) providing a plate having a face;
   (b) providing a cutter defined at least by part of a body of revolution having a major axis;
   (c) rotating said cutter about said major axis of said body of revolution;

(d) inclining said cutter so that its rotation axis is inclined at an acute angle to said face of the plate;

(e) burying said cutter in said face so as to cut in said plate a recess through which said rotation axis passes, the recess having a concave surface portion defined by part of said body of revolution, said concave portion having an axis which is inclined at an acute angle to said face of said plate and passes through the recess;

(f) repeating step (e) at intervals along said plate so as to produce a first row of recesses therein; and (g) repeating step (f) at intervals across said plate so as to produce in said plate further rows of recesses parallel to said first row.

2. The method according to claim 1, wherein between cutting successive recesses in step (f) said cutter is moved along said plate by a distance such that the successive recesses overlap, and between cutting successive rows in step (g) said cutter is moved across said plate by a distance such that said successive rows also overlap.

3. The method according to claim 1, further comprising the step of, after step (e), effecting relative linear movement between said cutter and said plate so as to extend the recess into an elongate groove having end regions which are each defined by part of said body of revolution and each of which has a major axis which is inclined at an acute angle to said face of said plate and also having a part-cylindrical mid-region.

4. The method according to claim 3, wherein said mid-region of the groove has a major axis and said relative linear movement between said cutter and said plate is effected at an acute angle to said face of said plate, such that said major axis of said mid-region of the groove is inclined at a similar acute angle to said face.

5. The method according to claim 4, wherein said relative linear movement between said cutter and said plate is effected at right-angles to the inclination of said rotation axis.

6. The method according to claim 3, wherein said relative linear movement between said cutter and said plate is effected in a direction lying in a plane which is perpendicular to said face of the plate and in which said rotation axis lies.

7. The method according to claim 1, wherein said cutter includes a circular cylindrical portion and a part-spherical portion which adjoins said circular cylindrical portion and which is co-axial therewith, and wherein at least part of said part-spherical portion and a part of said circular cylindrical portion are buried in said face of said plate during cutting of each recess.

8. The method according to claim 1, further comprising the step of, after step (g), using said plate as a master to produce a mould element for producing said lamp lens element.

9. A method of manufacturing a mould for producing a lamp lens element, comprising the steps of:

(a) providing a plate having a face;

(b) providing a cutter defined at least by part of a body of revolution having a major axis;

(c) rotating said cutter about said major axis of said body of revolution;

(d) burying said cutter in said face of the plate so as to cut a recess in said plate;

(e) effecting relative linear movement between said cutter and said plate at an acute angle to said face of said plate so as to extend the recess into an elongate groove having a part-cylindrical mid-region which has a major axis, said major axis of said mid-region being inclined at a similar acute angle to said face, and also having two end regions each of which is defined by part of said body of revolution and has a major axis;

(f) repeating step (e) at intervals along said plate so as to produce a first row of grooves therein; and (g) repeating step (f) at intervals across said plate so as to produce in said plate further rows of grooves parallel to said first row.

10. The method according to claim 9, wherein between cutting successive recesses in step (f) said cutter is moved along said plate by a distance such that the successive recesses overlap, and between cutting successive rows in step (g) said cutter is moved across said plate by a distance such that said successive rows also overlap.

11. The method according to claim 9, wherein the rotation axis of the cutter is held perpendicular to said face of said plate during the cutting of each groove, so that the major axis of each said end region of the groove is also perpendicular to said face.

12. The method according to claim 9, further comprising the step of, after step (g), using said plate as a master to produce a mould element for producing said lamp lens element.

13. A method of manufacturing a mold for providing a lamp lens element, comprising the steps of:

(a) providing a plate having a face;

(b) providing a cutter which is rotatable about a first axis and which has a cutting surface spaced from said first axis and formed at least partly by a portion which, taken in a plane including said first axis, has a profile which is symmetrical with respect to a second axis intersecting said first axis;

(c) rotating the cutter about said first axis;

(d) effecting mutual engagement between said rotating cutter and said face of said plate so as to cut in said face an elongate recess having a part-circular longitudinal cross-section, the longitudinal dimension of the elongate recess being greater than the length of the cutting surface as measured in the direction of extent of said first axis;

(e) during cutting of the recess, holding said first axis relative to said face of said plate such that said second axis is inclined at an acute angle to said face;

(f) repeating steps (d) and (e) at intervals along said plate so as to produce a first row of elongate recesses therein;

(g) repeating step (f) at intervals across said plate so as to produce in said plate further rows of elongate recesses parallel to said first row.

14. The method according to claim 13, wherein between cutting successive recesses in step (f) said cutter is moved along said plate by a distance such that the successive recesses overlap, and between cutting successive rows in step (g) said cutter is moved across said plate by a distance such that the recesses in said successive rows at least touch.

15. The method according to claim 13, further comprising the step of, after step (g), using said plate as a master to produce a mould element for producing said lamp lens element.

* * * * *